United States Patent Office 3,337,183
Patented Aug. 22, 1967

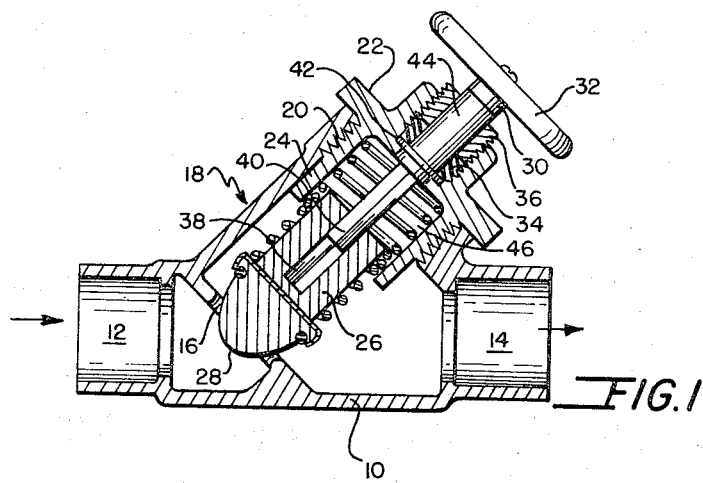
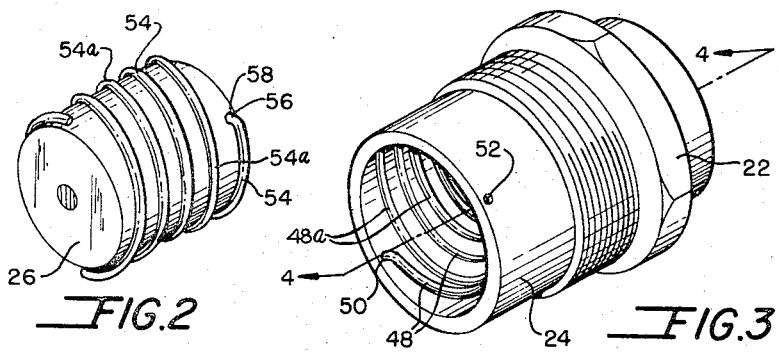
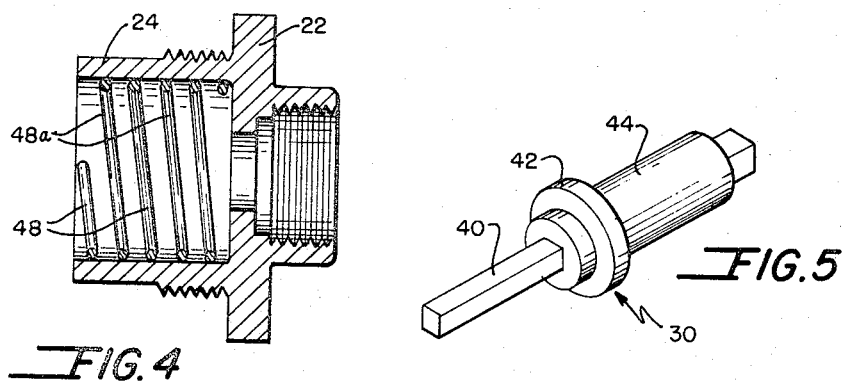
INVENTORS
GORDON N. BAUSTIAN
CARL E. HORNECK
BY Ralph C. Brick
ATTORNEY

3,337,183
VALVE CONSTRUCTION
Carl E. Horneck, Moline, Ill., and Gordon N. Baustian, Bettendorf, Iowa, assignors to American Air Filter Company, Inc., Louisville, Ky., a corporation of Delaware
Filed Jan. 6, 1965, Ser. No. 423,750
5 Claims. (Cl. 251—219)

ABSTRACT OF THE DISCLOSURE

A valve assembly including a valve head attached to a spool and movable relative to a cooperative seat where at least two cooperative, open, helical springs of the same pitch and diameter are disposed in intermeshing relation to provide the thread means for movement of the valve head relative to the valve seat when the spool is rotated.

---

Specifically, the invention is directed to a valve construction having a bonnet assembly in which these certain parts are threadably engaged with each other through the media of helical springs so that these parts may be fabricated with smooth surfaces rather than cut and taped screw threads.

A further object is the provision of such a bonnet assembly in which the springs are arranged so that in a closed position of the valve the yieldable characteristics of the helical springs are minimized to permit a tight shutoff.

A broader object is the provision of a bonnet assembly in which certain manufacturing economies may be realized.

In providing a valve according to the invention, the bonnet sleeve has a smooth-surfaced bore. The valve actuating spool of somewhat lesser diameter than the bore is disposed therewithin to form an annular chamber between spool and sleeve to accommodate the helical spring means. First open helical spring means with at least one end attached to the sleeve wall serve as the internal screw thread means for the sleeve, and second open helical spring means which have at least one end attached to the spool serve as the external thread means for the spool. The first and second spring means mesh with each other in the annular chamber so that rotation of the spool results in its corresponding axial movement. Preferably at least a pair of springs is used to provide both the internal threads for the bore, and the external thread for the spool, to promote stability of the threaded engagement.

In accordance with an important feature of the invention, the points at which the spring means are attached to their respective members are selected so that as the valve approaches a closed position, the points of attachment of the engaged springs approach a juxtaposed position. One expedient way of doing this is to attach the spool spring means at their outer ends, and the sleeve spring means at their inner ends. The purpose of this arrangement is so that the yielding characteristic inherent in the springs is substantially minimized when the valve is in a closed position.

The invention will be described in some detail in connection with the accompanying drawing illustrating one embodiment of the invention by way of example, and wherein:

FIGURE 1 is a sectional view of one form of valve in which the invention may be incorporated;

FIGURE 2 is an isometric view of the bonnet of a valve with the helical spring means disposed therewithin to form the internal threads in the bonnet sleeve;

FIGURE 3 is an isometric view of the spool which is adapted to be turned into the sleeve of the bonnet;

FIGURE 4 is a sectional view corresponding to one taken along the line 4—4 of FIGURE 2; and FIGURE 5 is an isometric view of a valve stem.

In the example of the drawing, the valve body is of the so-called Y type which includes the axially-aligned inlet 12 and outlet 14 with an obliquely disposed valve seat 16 therebetween, and an angle branch portion 18 provided with internal threads 20 at its open end to receive the bonnet 22 provided with the external threads on its sleeve portion 24.

The bonnet assembly generally includes, in addition to the inwardly open sleeve portion 24, a cylindrical spool element 26 in the sleeve, a valve head 28 carried by the spool, a valve stem 30 having a handle 32 on its outer end, and packing material 34 fitted into the packing recess end of the bonnet and compressed therewithin by the packing nut 36.

The bonnet assembly as a whole is assembled to the valve body by inserting the sleeve 24 into the branch portion 18 and then turning the bonnet assembly so that the internal threads 20 of the branch portion engage the external threads on the sleeve.

To effect rotation of the spool 26, it is provided with an axial non-circular bore into which a mating section of the valve stem fits. Square cross-sections for this spool bore and the stem are quite satisfactory, and are used herein as the examples of non-circular cross-sections. The stem 30 (FIG. 5) includes the inner end portion of square cross-section 40, a shoulder 42 which seats in the packing recess of the bonnet 22, and an outer end portion 44 of circular cross-section to which the handle 32 is secured. The stem is held in non-rising relation to the bonnet by the packing material 34 and nut 36. Accordingly, when the stem is turned, the rotational motion is transmitted to the spool through the engagement of the stem square cross-sectional inner length with the square cross-sectional bore of the spool. The axial movement of the spool results through the threaded relation between the spool and the sleeve, which will next be considered.

As noted, the invention is mainly concerned with the structure of the sleeve 24 and spool 26, and their threaded engagement through means of helical springs. In accordance with the invention, instead of cutting internal threads into sleeve in a metal cutting operation, the sleeve is provided with a smooth wall bore. Likewise, screw threads are not cut onto the outer surface of the spool, but rather a smooth wall is provided for this element. The outer diameter of the spool is significantly less than the inner diameter of the sleeve so that an annular chamber 46 is formed between the spool and the sleeve to accommodate the series of helical springs which provide the threaded engagement between the spool and the sleeve.

In the preferred arrangement, best shown in FIGURES 2–4, each of the first pair of helical springs 48 and 48a is attached to the inner surface of the sleeve 24 (FIGURE 2) by means of an outwardly-directed ear or lug end 50 (only one shown) projecting into a drilled hole 52 in the sleeve wall adjacent its inner and open end. This pair of helical springs 48 and 48a serves as the equivalent of internal threads for the sleeve 24. As is best shown in FIGURE 4, these springs are of sufficiently open character (that is, the pitch is sufficient relative to the thickness of the turns) that the two springs 48 and 48a as positioned in the sleeve leave adequate space between successive turns to accommodate the turns of the meshing springs to be assembled with the sleeve.

The spool 26 is also provided with a pair of open helical springs 54 and 54a. Each of these springs has an inwardly-directed lug end 56 which is inserted in a drilled hole 58 at the outer end of the circumferential wall of the spool.

As noted, the sleeve springs 48 and 48a are disposed with their lugs 50 at the end closest to the seat of the valve, while in the case of the spool springs 50 and 50a the lugs 56 are at the ends farthest from the valve seat. Accordingly, when the valve is shut off the lug ends of all the springs are in generally juxtaposed position in which the yielding character of the springs is substantially minimized. It will be appreciated this is of some significance insofar as the valve should be capable of a tight shutoff against substantial pressure, and by pegging the spring ends as described this result is readily accomplished in a structure according to the invention.

The provision of one pair of helical springs to serve as internal threads, and another pair to serve as external threads is preferred, over the provision of only a single spring for each, to provide stability in the threaded engagement. When a total of four springs are used in the arrangement, the helixes are substantially more open than if a total of only two springs is used. However, the total amount of spring material and turns will usually be about the same in either case. Thus as may be seen in FIGURE 4, there is, between the successive turns of the spring 48a, a turn of the spring 48b, and additionally space for a turn of each of spool springs 54 and 54a. If single springs are used instead of pairs, then the pitch of the spring is reduced to about one half of the pitch of the spring illustrated in the drawing to provide a correspondingly tight engagement of the coils.

Of course, if a set of three or even more springs are used with each part (such an arrangement being practical mainly where rather large parts and valves are involved), the pitch is correspondingly increased to accommodate the correspondingly greater number of turns used.

The invention claimed is:
1. A valve construction including:
a valve body having a seat;
a valve head movable relative to said seat;
a bonnet for said body, said bonnet including a sleeve having a cylindrical bore open toward said seat;
a cylindrical spool in said bore carrying said head;
first open helical spring means attached to said sleeve and extending in the annular space between said spool and said sleeve to provide internal thread means in said bore; and
second open helical spring means of the same pitch and diameter as said first spring means attached to said spool and extending in said annular space to provide external thread means on said spool meshing with said internal thread means.
2. A valve construction according to claim 1 in which: said first spring means includes a pair of diametrically opposite springs with the turns thereof uniformly spaced; and
said second spring means includes another pair of diametrically opposite springs with the turns thereof uniformly spaced and intermeshing in said annular space with said first pair.
3. A valve construction according to claim 1 in which:
said first spring means includes lug means attached, at the end closest to said seat, to said sleeve;
said second spring means include lug means attached, at the end farthest from said seat, to said spool;
the range of axial movement of said second spring means relative to said first spring means being limited by the position of said seat so that as said valve is closed by said spool moving out of said bore, said lug means move into generally juxtaposed position.
4. In a bonnet assembly for a valve:
a sleeve including a substantially smooth surfaced cylindrical bore axially aligned with the axis of the seat of said valve;
a spool in said bore, said spool carrying a valve head movable relative to said seat said spool being in the form of a cylinder of significantly less diameter than the diameter of said bore so that when said spool is within said sleeve an annular space is defined between said spool and said sleeve;
a first pair of open helical springs secured to said sleeve and extending in said annular space to provide internal thread means in said sleeve; and
a second pair of open helical springs, of the same pitch and diameter as said first pair of springs, attached to said spool and extending in said annular space to provide external thread means for said spool and engaging said internal thread means of said sleeve.
5. The bonnet assembly of claim 4 wherein:
each of said springs of said first pair includes an outwardly directed lug end at its end closest to said valve seat;
said sleeve includes holes receiving said lug ends;
each of said second pair of springs includes an inwardly directed lug end at its end farthest from said seat; and
said spool circumference includes holes to receive said inwardly directed lug ends.

References Cited
UNITED STATES PATENTS

| | | | |
|---|---|---|---|
| 1,468,747 | 9/1923 | Shoultz | 251—274 X |
| 1,780,825 | 11/1930 | Kuhn | 267—1 X |
| 2,000,905 | 5/1935 | Rockefeller | 267—1 X |
| 2,210,353 | 8/1940 | Barnes | 74—458 X |

WILLIAM F. O'DEA, *Primary Examiner.*

D. R. MATTHEWS, *Assistant Examiner.*